No. 755,612. PATENTED MAR. 29, 1904.
F. BURDETT.
ARTIFICIAL FISHING BAIT.
APPLICATION FILED MAY 5, 1903.
NO MODEL.
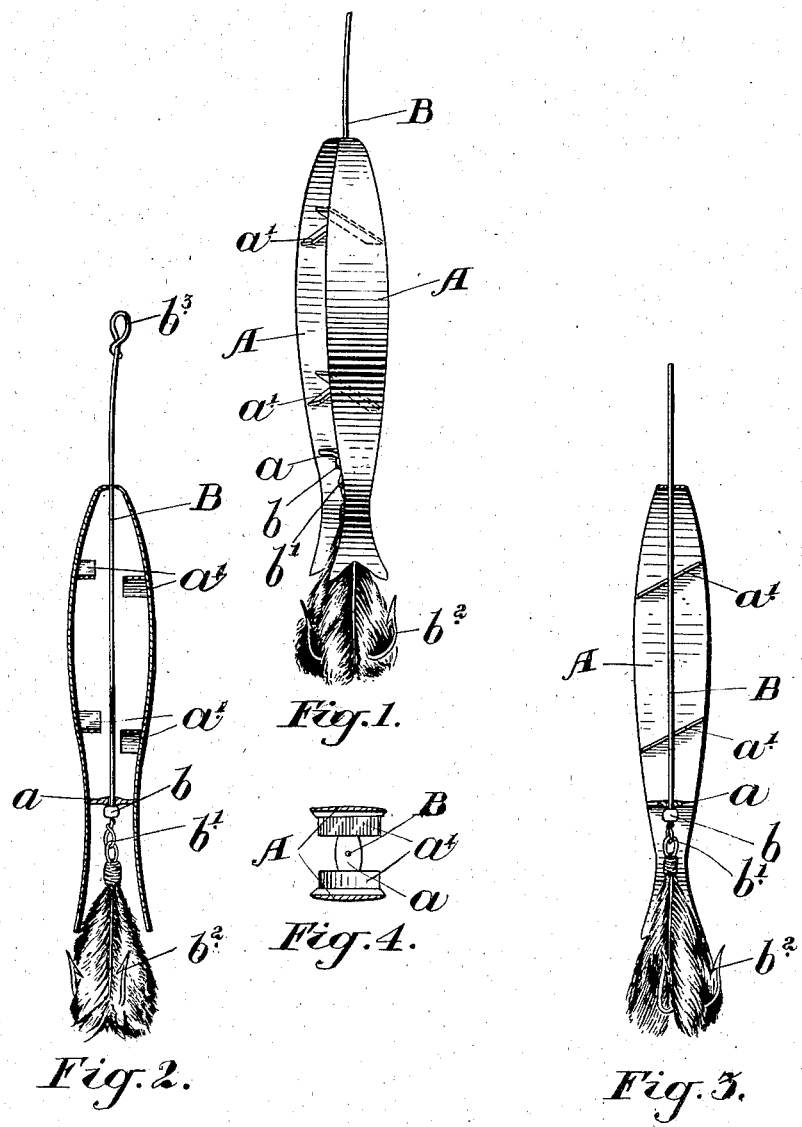

No. 755,612. Patented March 29, 1904.

UNITED STATES PATENT OFFICE.

FRANK BURDETT, OF GRAVENHURST, CANADA, ASSIGNOR, BY DIRECT AND MESNE ASSIGNMENTS, TO GEORGE STEVENSON AND HARRY BROOKS HOWSON, OF TORONTO, CANADA.

ARTIFICIAL FISHING-BAIT.

SPECIFICATION forming part of Letters Patent No. 755,612, dated March 29, 1904.

Application filed May 5, 1903. Serial No. 155,779. (No model.)

*To all whom it may concern:*

Be it known that I, FRANK BURDETT, machinist, of the town of Gravenhurst, in the county of Peterborough, in the Province of Ontario, Canada, have invented certain new and useful Improvements in Artificial Fishing-Baits, of which the following is a specification.

My invention relates to improvements in artificial fishing-baits; and the object of the invention is to devise a bait of the class called "artificial minnow," which may be adapted more particularly for trolling for maskalonge, bass, pike, or pickerel or other fish caught by troll, which may be readily bitten at by the fish without any danger of warding off the fish, and thereby allowing the fish to pass freely back onto the hook; and it consists, essentially, of a bent piece of metal having two sides substantially in the form of a minnow, such sides being connected in the tail portion by a cross-bar and being provided intermediate of their length on the interior of the sides with wings to induce rotation of the bait, the wire or cord passing through the head end and cross-bar and provided at the tail end with feathered hooks, such wire being designed to be connected to the line and the parts being arranged and constructed in detail, as hereinafter more particularly explained.

Figure 1 is a perspective view of an artificial fishing-bait constructed in accordance with my invention. Fig. 2 is a longitudinal section looking from the open side of the bait. Fig. 3 is a longitudinal section from the closed side of the bait. Fig. 4 is a cross-section.

In the drawings like letters of reference indicate corresponding parts in each figure.

A A are the two sides of the minnow-bait, which are preferably formed of one piece, the bend being preferably at the head end. The sides A A are provided at the interior with a cross-bar $a$ and wings $a'$ $a'$, at each side reversely set, so as to form substantially a thread of a screw.

B is a wire, which extends through a hole in the cross-bar $a$ and through a hole in the bent or connected end of the sides A A.

The wire B is provided with a bead $b$ on the outside of the cross-bar to retain the wire in place, and from an eye $b'$ extends the feathered hooks $b^2$, which are of the usual construction adapted in spoon-hooks for trolling and which, therefore, need not be particularly described.

The wire B has an eye $b^3$ at the front end, which is connected to the main fishing-line.

Having now described the principal parts involved in my invention, I shall briefly describe its utility.

As the artificial minnow is drawn through the water the wings $a'$ impart a rotary movement to the minnow from side to side or crosswise, and the sides being made of bright metal necessarily give very much the appearance of a real fish, and as such sides on the outside are perfectly smooth the artificial minnow offers no obstruction to the mouth of the fish, which when it bites at the minnow will cause the mouth of the fish to pass rearwardly over the smooth sides A A and backwardly on to the feather-hooks, by which the fish will be caught.

Heretofore it has been the practice to make the minnows with fins extending outwardly near the head end, and these had the effect of warding off the fish, because as soon as the fish bit at the bait the obstruction would cause it to let go and move away; but with my construction this objection is entirely avoided, as the wings which give the rotary movement to the bait are entirely inside the sides and offer no obstruction to the grip of the fish and allow a freedom in this respect and a consequent free movement backward on to the hooks, which is the end which I have in view and which I have found from a practical test to be an important desideratum in artificial baits of this character.

What I claim as my invention is—

An artificial fishing-bait comprising a strip of sheet metal doubled upon itself with a crossbar *a* extending between, a wire extending centrally through the cross-bar and between the doubled sheet metal and wings on the opposite inner sides of the doubled sheet metal said wings being independent of each other and those on one side inclining in the opposite direction from those on the other side, substantially as described.

FRANK BURDETT.

Witnesses:
  B. BOYD,
  M. McLAREN.